Figure 3:
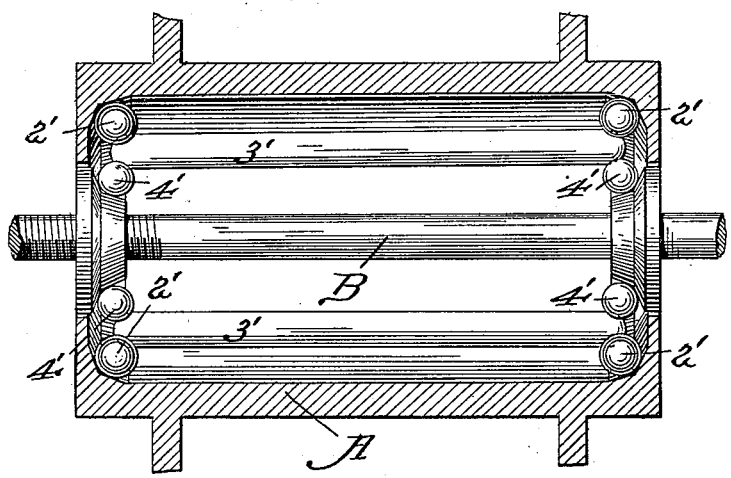

No. 665,653. Patented Jan. 8, 1901.
E. A. FALLER.
ANTIFRICTION BEARING.
(Application filed Apr. 26, 1900.)
(No Model.) 2 Sheets—Sheet 1.
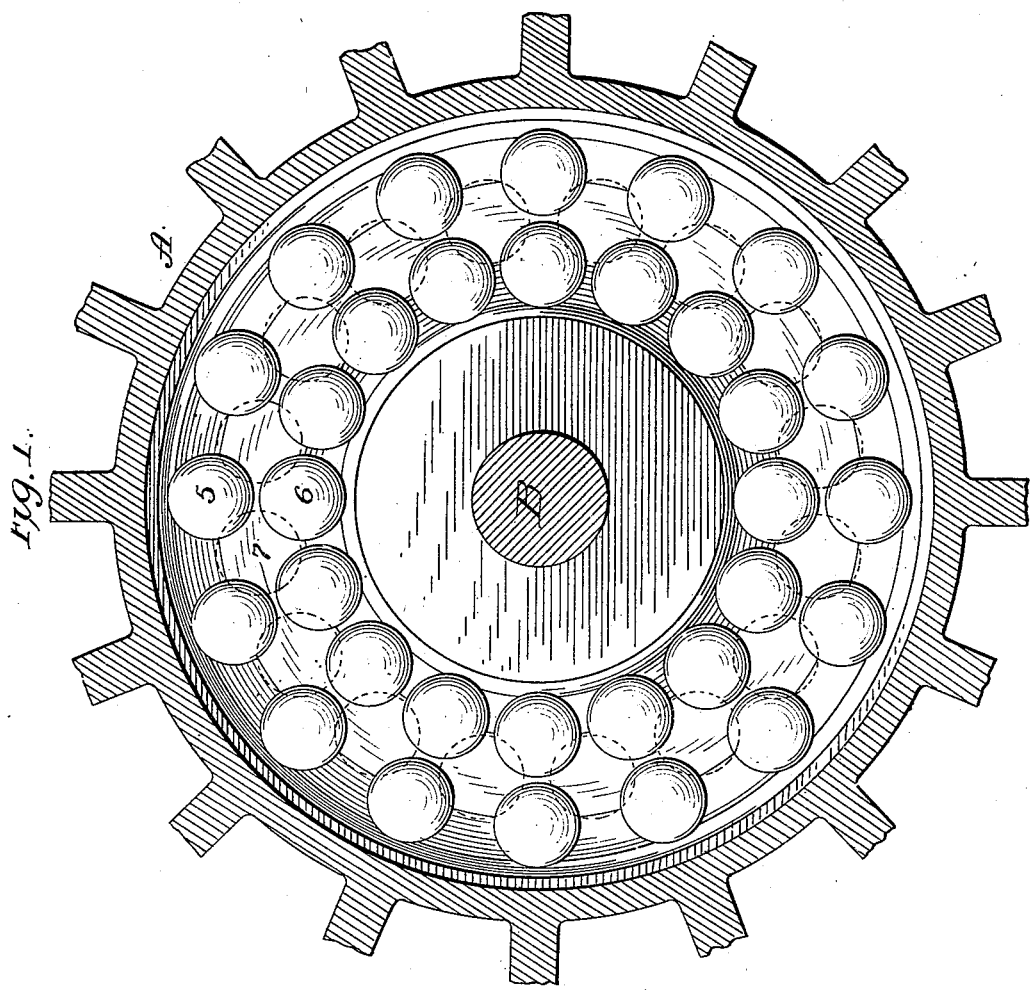
Inventor
ERNEST A FALLER No. 665,653. Patented Jan. 8, 1901.
E. A. FALLER.
ANTIFRICTION BEARING.
(Application filed Apr. 26, 1900.)

(No Model.) 2 Sheets—Sheet 2.

Attest
Edw. L. Reed

Inventor
Ernest A. Faller
by
Atty.

UNITED STATES PATENT OFFICE.

ERNEST A. FALLER, OF SAN FRANCISCO, CALIFORNIA, ASSIGNOR, BY MESNE ASSIGNMENTS, OF ONE-HALF TO THE ELECTRO-MECHANICAL IMPROVEMENT COMPANY, OF WEST VIRGINIA.

ANTIFRICTION-BEARING.

SPECIFICATION forming part of Letters Patent No. 665,653, dated January 8, 1901.

Application filed April 26, 1900. Serial No. 14,425. (No model.)

*To all whom it may concern:*

Be it known that I, ERNEST A. FALLER, a citizen of the German Empire, residing at San Francisco, California, have invented certain new and useful Improvements in Antifriction-Bearings, of which the following is a specification.

My invention relates to roller-bearings. I have shown it in connection with the axle and hub of a wheel; but it is applicable to any position or use where roller-bearings are ordinarily used.

The object of my invention is to avoid the frictional contact of the rollers either with each other or with the cage containing the rollers by taking up the pressure in whatever direction exerted by other rollers. It is illustrated in the accompanying drawings, in which—

Figure 1 is a sectional view of the hub transversely of the shaft, the balls being shown in elevation. Fig. 2 is a sectional view of the hub and shaft longitudinally of the latter. Fig. 3 illustrates a longitudinal sectional view of a modification.

In the bearing herein illustrated in Figs. 1 and 2 the hub of the wheel or other casing in which the balls are contained is shown at A, which is provided with bearing-surfaces $b$ and an internally-threaded flange $c$, which receives the cup $d$, having bearing-surfaces $b'$ corresponding to the surfaces $b$. The axle is shown at B, having one integral cone $f$ with a bearing part $g$, and a threaded axial extension adapted to receive a correspondingly-shaped cone having similar bearing parts $g'$. The rolling bearing-surfaces interposed between the cones and the casing and cup comprise two outer series of balls 5 5, bearing on the surfaces $b\ b'$, and two inner series of balls 6 6, bearing upon the cones, and between the two series and bearing diagonally on both sets of balls of both series a third series of balls 7 are placed. In this arrangement all end thrust is provided for in the balls themselves, as the series 5 5 and 6 6 find bearing upon the cones $g\ g'$ and parts $b\ b'$. In this form the balls which bear upon the hub or casing and those which bear upon the shaft or axle and sustain the end thrust rotate about axes inclined in respect to the shaft or axle, while the intermediate balls rotate about axes which are parallel with the shaft or axle.

The series shown in Fig. 1 might be repeated to provide for a longer bearing to any desired extent.

I have shown in Fig. 3 a modified form of the roller-bearing. Instead of the extensions of the bearing by repetition of the balls, as explained above, I may also extend the bearing with the same effect and with fewer parts by elongation of the intermediate balls of Fig. 2 into the form shown in Fig. 3, in which the intermediate element is a series of cylinders 3' with hemispherical ends. These ends bear upon the two outer series of balls 2' 4' exactly as the intermediate balls bear and with the same effect. The length of the intermediate cylinders depends upon the length of bearing required. The casing in this figure is shown for illustration and may be of any desired kind; but, as above explained, the intermediate or interior series which is combined with the two outer series of balls may be either spheres or cylinders having rounded, conical, or beveled ends or even two balls rigidly connected.

I claim—

1. An antifriction-bearing comprising a double series of outer rolling parts, a double series of inner rolling parts and a single series of rolling parts arranged between the outer and inner series of rolling parts, substantially as described.

2. An antifriction-bearing consisting of two outer series of rolling parts and two inner series, and an intermediate series of rolling parts bearing on and between the parts of the inner and outer series, said rolling parts being adapted and arranged to sustain the end thrust, substantially as described.

3. An antifriction-bearing comprising three series of rolling parts, the outer and inner series being formed of balls and the intermediate series bearing upon the balls of the outer and inner series, substantially as described.

In testimony whereof I affix my signature in presence of two witnesses.

ERNEST A. FALLER.

Witnesses:
G. W. BALLOCH,
C. W. STEERS, Jr.